United States Patent [19]
Verdier

[11] 3,779,011
[45] Dec. 18, 1973

[54] FUEL UNIT FOR A HYBRID HOT-GAS GENERATOR

[75] Inventor: Claude H. Verdier, Neauphle-le-Chateau, France

[73] Assignees: Office Nationale d'Etudes et de Recherches Aerospatiales, Chatillon-sous-Bagneux; Etat Francais represente par le Ministre d'Etat Charge de la Defense Nationale, Delegation Ministerielle pour l'Armement, Direction des Poudres, Paris, France

[22] Filed: July 19, 1971

[21] Appl. No.: 163,987

[30] Foreign Application Priority Data
July 22, 1970 France .............................. 7027104

[52] U.S. Cl. .................................................. 60/251
[51] Int. Cl. ............................................ F02k 9/00
[58] Field of Search ................. 60/250, 251, 256, 60/257, 253, 258, 219, 220, 39.47; 102/101, 102/103; 149/2, 14, 15

[56] References Cited
UNITED STATES PATENTS

| | | | |
|---|---|---|---|
| 3,137,126 | 6/1964 | Madison | 60/253 X |
| 3,267,672 | 8/1966 | Craig et al. | 60/39.82 R X |
| 3,568,448 | 3/1971 | Webb | 60/250 |
| 3,457,726 | 7/1969 | Trotel | 60/250 |
| 3,108,433 | 10/1963 | De Fries et al. | 102/103 X |
| 3,677,010 | 7/1972 | Fink et al. | 60/250 X |
| 3,635,030 | 1/1972 | Schubert et al. | 60/251 |

*Primary Examiner*—Carlton R. Croyle
*Assistant Examiner*—Michael Koczo, Jr.
*Attorney*—Larson, Taylor & Hinds

[57] ABSTRACT

A fuel unit for a hybrid hot-gas generator comprises two consumable constituent parts of different compositions which are separated by a partition which in storage conditions is stable and chemically inert with respect to said two parts and which is consumable during operation of the generator. Reactions between said constituent parts during storage, which might impair the combustion of the fuel unit, are thereby prevented.

6 Claims, 2 Drawing Figures

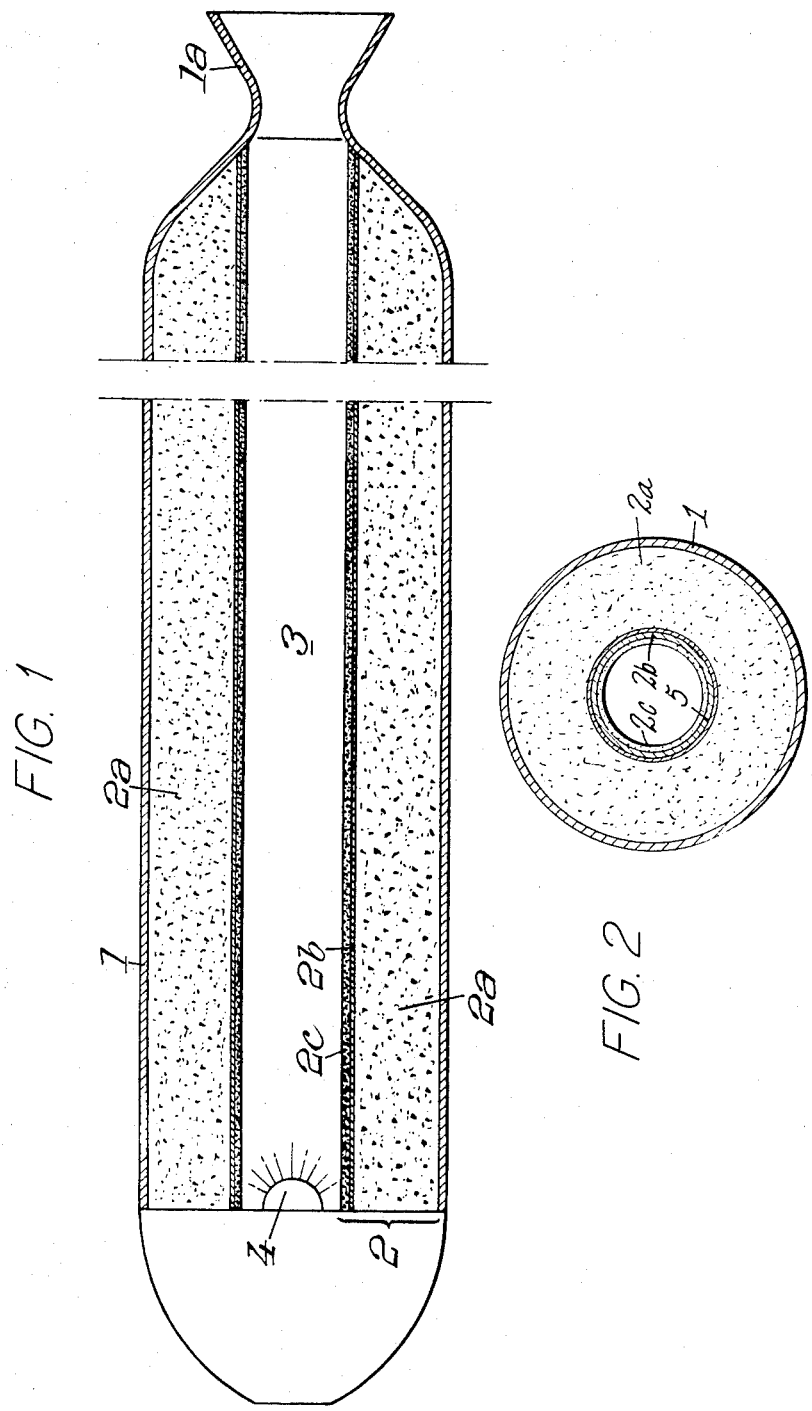
PATENTED DEC 18 1973 3,779,011

FUEL UNIT FOR A HYBRID HOT-GAS GENERATOR

The invention relates to solid fuel units adapted to be placed in the combustion chamber of a hybrid hot-gas generator, for example a rocket motor - i.e., a gas generator of a kind in which a fluid-phase oxidant delivered progressively into the combustion chamber leads to the burning of the fuel unit.

The invention also relates to methods of preparing such units.

Units of this kind, hereinafter called "composites," are known which comprise a number of parts consisting of various chemical compositions, the parts being in intimate contact with one another so as not to impair the monolithic nature of the fuel unit. For instance, there are known in the prior art composite fuel units consisting of adjacent sections or portions of different kinds and arranged in series along the combustion-chamber axis and each having different affinities for the fluid-phase oxidant of the generator.

Also known in the prior art are composite fuel units consisting of adjacent coaxial parts disposed one within the other and having different affinities for the fluid-phase oxidant of the generator.

Some of the constituent parts of such composite units can be hypergolic to the fluid-phase oxidant concerned - i.e., they can react spontaneously therewith simply as the result of being present in generator utilisation conditions.

In general, the constituent parts of composite fuel units falling within the field of this invention can each comprise one or more constituents giving the particular unit part concerned a fuel and, if needed, a hypergolic character as well. Amongst such constituents there can be mentioned finely divided hypergolic substances, readily flammable energy releasing metal powders and consumable and, with advantage, combustible agglomerants.

The storage of composite fuel units of this kind raises problems, particularly when the units have a highly hypergolic constituent part in contact with another combustible constituent part which may contain functional chemical groups for improving its combustion performances, as is the case for example with central-channel type composite fuel units comprising a combustible main part lined with a hypergolic initiating part. There is a risk in such cases, particularly after lengthy storage in hot climates, of physical and/or chemical interactions between two different adjacent constituent parts of a composite fuel unit, the interactions beginning along the contact surfaces of the adjacent parts and possibly spreading in depth from these surfaces to inside the one and/or the other of the constituent parts.

It is one object of this invention to obviate this risk.

According to the invention there is provided a fuel unit for a hybrid hot-gas generator, said fuel unit comprising two consumable constituent parts of different compositions wherein the improvement comprises a separating partition interposed between and separating said two parts, said partition being composed of a substance which is stable and chemically inert with respect to said two constituent parts in storage conditions, and which substance is consumable in operation of the generator, whereby said partition, in storage conditions, prevents chemical and physical reactions between said constituent parts which might impair the integrity of said parts and subsequently impair the combustion process.

As well as reliably precluding deterioration of the fuel unit in storage, the invention widens the choice of compositions which can be used for the two constituent parts of the unit which are separated from one another by the partition, for absence of physical and chemical reactivity between the two constituent parts is then not such a stringent necessity as in the prior art devices in which the constituent parts are in direct and intimate surface contact with one another. Also, the barrier function of the partition in storage in no way impairs the consumption of the whole fuel unit when the hot-gas generator is in use.

Consequently, the choice of thickness and composition of the material used for the partition depends upon the nature of the two constituent parts between which the partition is disposed. The partition can in most cases be embodied with advantage as a metal or plastics sheet readily consumable by melting and/or combustion.

Advantageously, as regards the preparation and positioning of the partition, the following are possibilities according to circumstances and according to features of the invention;

Either the partition can be stuck, using an appropriate adhesive, to one side of a polyethylene cloth whose other side can be given a layer of one of the constituent parts of the unit, the whole then being shaped and secured to the other constituent part of the unit, or the partition can be stuck directly, using an appropriate adhesive, to one of the constituent parts of the unit, whereafter the other constituent part thereof can be fitted to the exposed or free side of the partition.

The present invention can be used very advantageously for central-channel type composite fuel units comprising a main part which is little, if at all, hypergolic to the oxidant used, plus an auxiliary initiating part which is coaxial of the main part and adjacent the same on the side of the central channel which it bounds before the start of combustion, the auxiliary part being definitely hypergolic — and in any case much more hypergolic than the main part — to the oxidant.

DESCRIPTION OF THE DRAWING

FIG. 1 of the accompanying drawing is a diagrammatic view in longitudinal section, with parts removed, of an embodiment of a rocket motor using a composite fuel unit according to the invention;

FIG. 2 shows, in cross-section, another embodiment.

The rocket motor shown in the drawing comprises a casing 1 extended rearwardly to provide a nozzle 1a, the inside wall of casing 1 supporting a composite fuel unit which has the general reference 2 and which comprises a central, axial channel or passage 3. An injector device 4 of the rocket motor is adapted to discharge a fluid oxidant progresively into the upstream end of passage 3. The unit 2 comprises three adjacent coaxial elements, one within the other and which are, proceeding from the outside towards the inside, a main fuel part 2a which is little, if at all, hypergolic to the oxidant delivered by injector 4, a separating partition 2b and an initiating auxiliary part 2c which bounds the central passage 3 and which is definitely hypergolic to the oxidant.

The following examples disclose various possibilities for the three constituent parts 2a, 2b, 2c of the composite fuel unit 2, the nature of oxidant delivered by the injector 4 being specified for each example.

In the embodiment of FIG. 2, the partition 2b is stuck by a suitable adhesive to one side of a polyethylene cloth 5, whose other side bears a layer 2c of the initiating part of the unit.

EXAMPLE 1

Oxidant: at least 95 percent concentrated hydrogen peroxide.

Main part 2a of fuel unit: aluminated carboxylated polybutadiene.

Initiating auxiliary part 2c; phosphorus tri N methylimide dissolved in an equal weight of petroleum ether (a volatile solvent), the solution being placed on a cylindrical unfurled polyethylene cloth sleeve of the same diameter as the central passage 3.

Partition 2b; tin foil (melting at 232°C) 65 $\mu$ thick, previously stuck to the outer wall of the polyethylene cloth by an epoxy resin such as Araldite.

The sleeve of polyethylene cloth, the auxiliary part 2c and the partition 2b are slid and secured e.g. by stapling or sticking in the passage 3.

The partition 2b is destroyed by melting in operation of the motor and it has been found that the ignition time of a composite fuel unit of this kind was unchanged after three days storage at 55°C in an inert gas.

EXAMPLE 2

The oxidant and the parts 2a, 2c are the same as in Example 1.

The partition 2b is a 100 $\mu$ thick polyethylene foil or film or sheet or the like which has been previously stuck by an epoxy adhesive to the unfolded polyethylene cloth, the partition 2b being destroyed mainly by burning.

EXAMPLE 3

Oxidant: a 60–40 percent mixture of nitric acid and nitrogen peroxide.

Main part 2a; cast metataluenediamine.

Part 2c; dimethylhydrazinediborane, the whole being bonded by a cellulose adhesive, such as Durofix.

Partition 2b: 50 $\mu$ thick aluminum foil which has been previously stuck by an epoxy resin to the wall of the central passage 3, the initiating auxiliary part 2c being brushed on to the inside surface of the aluminum sheet.

EXAMPLE 4

Oxidant: the same as in Example 3.

Main part 2a: paraphenylene diamine.

Auxiliary part 2c: phosphoric tri N methylimide positioned as in Example 1.

Partition 2b: 65 $\mu$ thick tinfoil positioned as in Example 1.

The ignition time was found to be unchanged after three days storage at 55°C in an inert gas.

EXAMPLE 5

Oxidant: nitrogen peroxide.

Main part 2a: cast metataluenediamine.

Auxiliary part 2c: the same as in Example 3.

Partition 2b: the same as in Example 4.

Clearly, and as the foregoing shows, the invention is not limited to those of its uses and embodiments which have been more particularly considered but covers all the variants.

I claim:

1. A fuel unit for a hybrid hot-gas generator, said fuel unit comprising two consumable constituent parts of different compositions reactive to one another during storage, one said part lining the other to form a central axial passage for fluid flow, and a separating partition interposed between and separating said two parts, said partition being composed of a substance which is stable and chemically inert with respect to said two constituent parts under conditions existing prior to operation of the fuel unit, and which substance is consumable by melting or combustion or both on combustion of the fuel unit without impairing the consumption of the whole fuel unit, said partition being applied in closed contact with said two parts whereby it prevents chemical and physical reactions between said two parts under said pre-operational conditions which reactions might impair the integrity of said parts and subsequently impair the combustion process.

2. The fuel unit of claim 1 wherein said partition is a metal sheet.

3. The fuel unit of claim 1 wherein said partition is a synthetic plastics sheet.

4. The fuel unit of claim 1 wherein said partition is secured directly to one of said constituent parts and wherein the other of said constituent parts is carried on the surface of said partition remote from said one of said constituent parts.

5. The fuel unit of claim 1 wherein said partition is secured to a polyethylene cloth carrying one of said constituent parts.

6. The fuel unit of claim 1 wherein one of said two constituent parts is a main fuel part having an axial passage therein, means for supplying an oxidant to said fuel unit, said main part being substantially non-hypergolic in relation to said oxidant for the fuel unit, wherein said partition is in the form of a sleeve within said axial passage and coaxial therewith, and wherein the other of said constituent parts is an auxiliary initiating part formed as a layer on the inner surface of said partition, said layer defining by its inner surface said central axial passage in the fuel unit, said auxiliary initiating part being strongly hypergolic in relation to said oxidant.

* * * * *